(12) United States Patent
Bardsley et al.

(10) Patent No.: US 6,834,365 B2
(45) Date of Patent: Dec. 21, 2004

(54) INTEGRATED REAL-TIME DATA TRACING WITH LOW PIN COUNT OUTPUT

(75) Inventors: Thomas J. Bardsley, Poughkeepsie, NY (US); Robert M. Bunce, Hopewell Junction, NY (US); Timothy M. Kemp, San Jose, CA (US); Brian J. Schuh, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 09/907,387

(22) Filed: Jul. 17, 2001

(65) Prior Publication Data

US 2003/0018929 A1 Jan. 23, 2003

(51) Int. Cl.⁷ ................................................ G06F 11/00
(52) U.S. Cl. .............................. 714/45; 714/30; 714/39
(58) Field of Search ............................ 714/30, 39, 45, 714/734; 717/128; 703/28

(56) References Cited

U.S. PATENT DOCUMENTS

| | | | |
|---|---|---|---|
| 3,659,272 A | 4/1972 | Price et al. | |
| 3,673,573 A | 6/1972 | Smith | |
| 4,674,089 A | 6/1987 | Poret et al. | |
| 4,835,675 A | 5/1989 | Kawai | |
| 5,359,608 A | 10/1994 | Belz et al. | |
| 5,446,876 A | 8/1995 | Levine et al. | |
| 5,491,793 A | 2/1996 | Somasundaram et al. | |
| 5,764,885 A | * 6/1998 | Sites et al. | ..................... 714/45 |
| 5,862,371 A | 1/1999 | Levine et al. | |
| 5,897,653 A | 4/1999 | Tashima | |
| 5,933,626 A | 8/1999 | Mahalingaiah et al. | |
| 5,944,841 A | 8/1999 | Christie | |
| 6,314,530 B1 | * 11/2001 | Mann | ........................... 714/38 |
| 6,665,821 B1 | * 12/2003 | Miyayama et al. | ............ 714/45 |
| 2002/0184477 A1 | * 12/2002 | Swaine et al. | .............. 712/227 |
| 2002/0199172 A1 | * 12/2002 | Bunnell | ....................... 717/128 |

* cited by examiner

Primary Examiner—Scott Baderman
(74) Attorney, Agent, or Firm—DeLio & Peterson, LLC; Robert Curcio; H. Daniel Schnurmann

(57) ABSTRACT

An integrated circuit real-time data tracing apparatus for analyzing microprocessor based computer systems for monitoring, in real-time, parameters sufficient to define the load and store operations information that the embedded core controller may assert, and process information during events. Integral on this single chip apparatus is a data trace unit designed to access control, address, and data signal lines required to monitor the embedded core controller's activities; perform data tracing independent of instruction tracing; synchronize with an instruction trace stream; allow for selection of multiple ranges for data tracing; report lost events to a FIFO array; and, output strobe signals to give a cycle accurate indication of when an event has been captured.

32 Claims, 6 Drawing Sheets

Data Trace Unit Attachment to Embedded Processor

Data Trace Unit Attachment to Embedded Processor

INTEGRATED REAL-TIME DATA TRACING WITH LOW PIN COUNT OUTPUT

BACKGROUND OF THE INVENTION

1. Field of the Invention

The present invention relates in general to analyzing microprocessor based computer systems, and more particularly to real-time data tracing with logic circuitry on the same integrated circuit chip as the microprocessor.

2. Description of Related Art

Embedded microprocessors do not provide to external instrumentation the same accessibility to their I/O signals as found on stand-alone microprocessor modules. This has caused a shift in In-Circuit Emulation (ICE) techniques, originally from using external instrumentation that plugs into a microprocessor socket in place of the microprocessor, to adding various forms of ICE logic on the chip itself. Normally, the on-chip logic has access to the necessary control, address, and data signals required to monitor the embedded microprocessor's activity and an output port for transferring this information from the chip to other monitoring equipment.

ICE is primarily used for the purpose of developing and debugging the program code before it is released from the factory to the user or consumer. Minimally, ICE requires components that identify a trigger event from which program code is subsequently traced, a means to buffer the trace data, and a means of displaying the trace results on external instrumentation. A programmer is more often concerned with seeing an instruction trace which provides insight to the program flow. Most of the existing prior art solutions address this requirement. However, the need for data tracing at real-time processing speeds using circuitry on the same chip as the embedded microprocessor has not been evident in the art. This solution provides the programmer with information on the data values that have been stored in or read from memory elements by the microprocessor as well as the addresses of those memory elements in real-time.

The problem of accessing data values and their associated memory locations arises with modern processors which can load and store data at high speeds with respect to the bandwidth of the off-chip path. These processors are capable of single cycle load and store instructions at high clock rates resulting in the need to capture bursts of load or store information very rapidly, and to send data, address, and associated load/store indicators off the microprocessor chip to external instrumentation at a fast enough rate to accommodate post-processing and display of the reconstructed trace information. The present invention addresses this deficiency in the art.

Methods described in the prior art typically require more silicon area or a larger footprint in the form of buffer memory, and more I/O pins in order to meet the off-chip bandwidth requirements. Furthermore, these circuits are often removed at the final release of the design and before volume shipments. For example, in U.S. Pat. No. 4,674,089 (the "'089 patent") issued on Jun. 16, 1987 to Poret, et al., entitled "IN-CIRCUIT EMULATOR," a complete In-Circuit Emulation circuit originally designed for use with an Intel 16 bit CISC processor is taught. The circuit is intended to be on the same chip as the microprocessor, but is removed prior to production. The '089 patent ICE circuit determines if captured data should be stored into a memory based on the results of a comparison test. It teaches and discloses a method using a content addressable memory and software programmable logic in the form of a programmable logic array (PLA). In contrast, the present invention's circuitry is not removed prior to production or shipping, and uses multiple event filters based on range comparison logic to perform the stored memory determination.

Similarly, U.S. Pat. No. 5,491,793, (the "'793 patent") issued on Feb. 13, 1996, to Somasundaram, et al., entitled "DEBUG SUPPORT IN A PROCESSOR CHIP," teaches an ICE circuit used to support code debugging for a 32 bit RISC processor on a single chip. However, unlike the present invention, the '793 patent design applies to instruction tracing only, and its central processing unit must rely on external instrumentation to set trigger points or break points.

The prior art has not addressed previously the ability to work without instruction tracing. In the present invention, the designer is allowed to implement only the trace unit, or both the instruction and data trace units. Additionally, the information required by trace reconstruction software to combine separate instruction and data tracing data streams is available in the present invention, but absent in the prior art.

I/O pin count represents another existing area of concern in the prior art. The present invention allows for a trade-off of the number of I/O pins used for the data path against the probability of losing events. Similarly, the architecture of the present invention allows the designer to trade-off the FIFO (First-In First-Out) register size with the probability of losing events; an advantage not currently realized in the prior art.

Bearing in mind the problems and deficiencies of the prior art, it is therefore an object of the present invention to provide an integrated real-time data tracing apparatus on the same chip as the microprocessor, designed not to be removed prior to production or shipping.

It is another object of the present invention to provide on-chip logic having access to control, address, and data signal lines required to monitor an embedded microprocessor's activities.

A further object of the invention is to provide an integrated real-time data tracing apparatus on the same chip as the microprocessor requiring less I/O pins to meet the off-chip bandwidth requirements.

It is yet another object of the present invention to provide an integrated real-time data tracing apparatus that works with or without instruction tracing.

A further object of the invention is to provide an integrated real-time data tracing apparatus that allows for synchronization with the instruction trace stream.

Another object of the invention is to provide an integrated real-time data tracing apparatus that allows for a trade-off of the number of I/O pins used for the data path against the probability of losing events.

Yet another object of the invention is to provide an integrated real-time data tracing apparatus that allows for the selection of multiple ranges for tracing.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, an integrated real-time data tracing apparatus for analyzing microprocessor based computer systems, comprising: an embedded core controller; a processor local bus connected to the core controller; a memory controller interfacing to the processor local bus; an embedded random access memory accessible by the memory controller; an instruction cache and a data cache interfacing with the core controller; an instruction side on-chip memory and a data side on-chip memory interfacing with the core controller; and, a data trace unit connected to the data-side on-chip memory and to an auxiliary processor unit interface, the data trace unit comprising electronic logic circuitry to electronically monitor in real-time parameters sufficient to define the load and store operations information that the core controller may assert, process information during events, select multiple address ranges for tracing, filter the information, and synchronize data trace information with instruction trace information. The load and store operations information comprises address, data, and byte enables of an operations indicator and a load/store indicator. The data trace unit includes: device control registers connected to the embedded core controller; event capture logic connected to the instruction side on-chip memory and the data side on-chip memory, having outputs to event filter logic, a FIFO array, and a FIFO control module; the event filter logic receiving store, load and address bus lines from the event capture logic, and returning a match signal to the event capture logic; the FIFO control module interfacing with the FIFO array, adapted to receive an event capture signal from the event capture logic, and output information to output control logic; the output control logic having an external interface to communicate via I/O pins, and a local bus interface to communicate to the embedded random access memory. Also included are software algorithms for reconstruction of data produced by the data trace unit with an instruction stream of data being executed.

In a second aspect, the present invention is directed to a data trace unit apparatus for a single chip integrated circuit embedded core controller designed to achieve a low bandwidth output path, comprising: a FIFO control and array for buffering the bursts of load and store events; a plurality of event filters to distinguish only those events in predetermined address ranges; an output path having a programmable width; a lost event indicator capable of accommodating an overrun of the FIFO; and, encoding circuitry for encoding an output control pinout, allowing for a variable number of output cycles per event.

In a third aspect, the present invention is directed to a real-time data tracing apparatus on an integrated circuit chip comprising: an embedded core controller that allows visibility of address and control signals being presented to caches; a data trace unit designed to acquire signals from the core controller through a data-side on-chip memory module interface and through an auxiliary processing unit interface, the data trace unit adapted to view the address and control signals being presented to the caches by the embedded core controller, capture store indicator, address, byte enables, and store data information from the on-chip memory module interface, and capture load data from the auxiliary processing unit interface; a processor local bus for interfacing the core controller with memory modules; a data trace port interfacing with the data trace unit; and, an instruction trace port connected to the core controller. The data trace unit comprises electronic logic circuitry designed to transmit information via the data trace port, the electronic logic circuitry adapted to adhere to procedural restrictions including: sending idle characters when no events are present; taking a snapshot of a current instruction address register from the core controller when an event is inserted into an empty FIFO array and transmission of an instruction address register is enabled; sending a control byte when there is a partial load/store or when not all byte enables are set; sending an appropriate number of address bytes as a function of an output control register setting; and, inserting a control character into an output stream at the point of losses when events have been lost since a previous event was transmitted, and resetting event counters. The data trace unit further comprises: a plurality of register sets connected to the device control register bus; event capture logic having electronic logic circuitry capable of capturing a load or store event data acquired from the on-chip memory and the auxiliary processor unit interface; a FIFO register control and a FIFO array having electronic logic circuitry for storing the event information; output control logic having electronic logic circuitry for transmitting information from the event off the integrated circuit chip; and, support logic to control data flow.

In a fourth aspect, the present invention is directed to a data trace unit apparatus for a single chip integrated circuit embedded core controller comprising electronic logic circuitry adapted to: access control, address, and data signal lines required to monitor the embedded core controller's activities; perform data tracing independent of instruction tracing; synchronize with an instruction trace stream; allow for selection of multiple ranges for data tracing; report lost events to a FIFO array; and, output strobe signals to give a cycle accurate indication of when an event has been captured.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
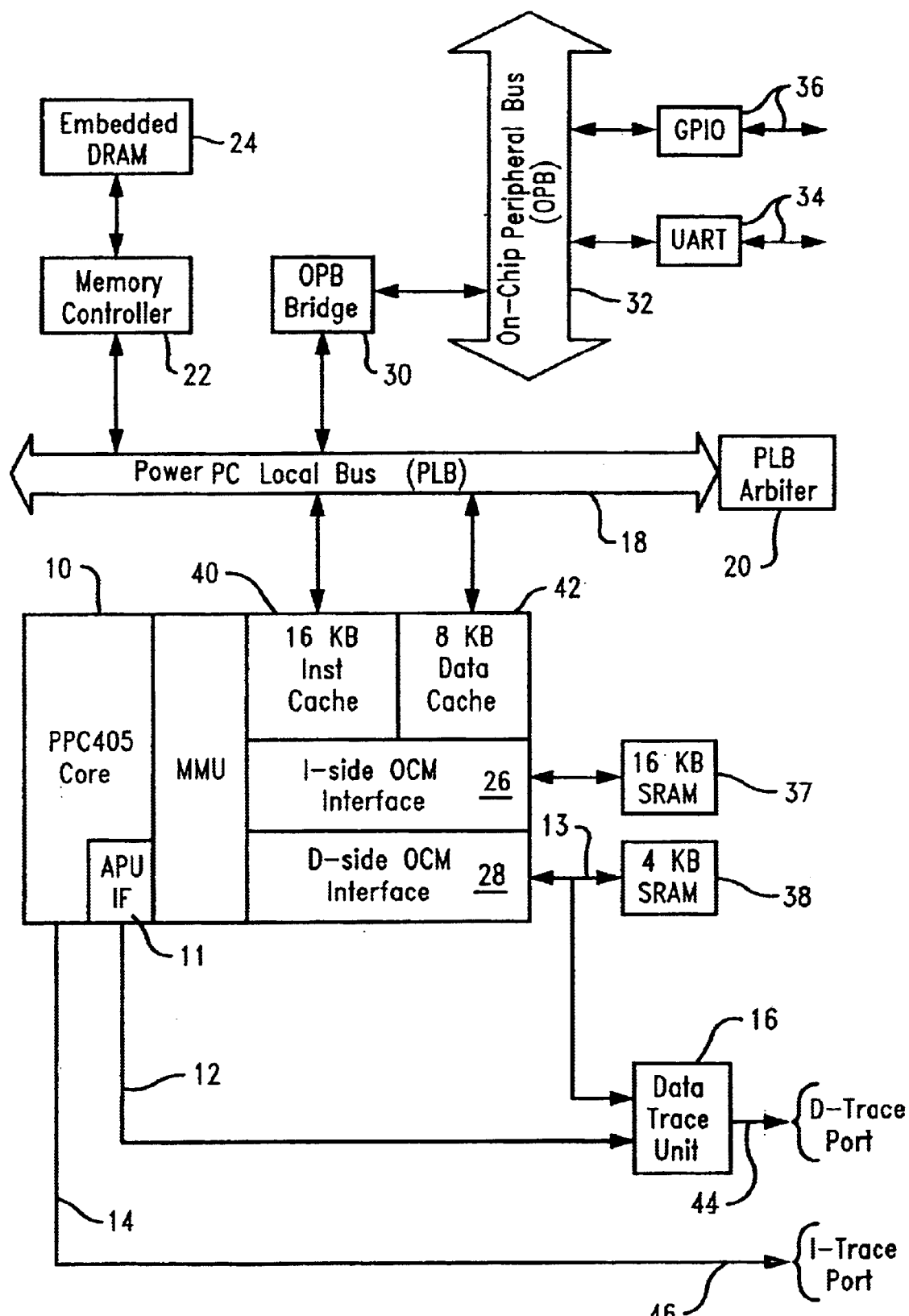
FIG. 1 is an example system-on-a-chip (SOC) architecture for the present invention.

In describing the preferred embodiment of the present invention, reference will be made herein to FIGS. 1–6 of the drawings in which like numerals refer to like features of the invention. Features of the invention are not necessarily shown to scale in the drawings.

The preferred embodiment is referred to as the Data Trace Unit (DTU), and was designed as an optional add-on to an embedded controller, preferably a PowerPC 405 embedded RISC controller. An example system-on-a-chip (SOC) architecture is shown in FIG. 1. This architecture comprises a core controller 10, preferably a PPC405 core controller, having a device control register bus. The core controller 10 interfaces through I/O lines 14 to an instruction trace port. Located on the same chip as the core controller is an instruction-side on-chip memory (OCM) 26 and a data-side on-chip memory 28. These OCMs are configured for a two-way interface with SRAM modules 37, 38. An I/O line 13 providing the two-way interface between the data-side on-chip memory interface module to the SRAM 38 also connects to Data Trace Unit 16, which interfaces with a Data Trace port. The instruction cache 40 and data cache 42 interface to a processor local bus (PLB) 18, preferably a PowerPC Local Bus, which directly connects to a local bus arbiter 20. A memory controller 22 interfaces with the PLB 18 and an embedded DRAM 24 or SRAM (not shown). An on-chip peripheral bridge 30 is connected through an on-chip peripheral bus 32 to a UART 34 and a general purpose I/O module (GPIO) 36.

An instruction trace facility is built directly into the core controller. Since many configurations are possible, the only requirement for use of a data trace unit in a microprocessor based system is that the address, data, and control signals, which delineate and enable the capture of all load and store event information, are available on the processor's I/O interface. In this example, both the instruction and data trace outputs are sent off-chip and clocked into the same external instrumentation for post-processing where both the instruction and data traces are combined and formatted for display. However, this does not preclude routing the trace outputs to a large on-chip buffer such as a portion of a DRAM where sections of the trace output can be stored for later post-processing and analysis. A designer may implement only the trace unit required. When both the instruction and data trace units are implemented, only the data of interest may be isolated and selected by a user for capture by an external diagnostic instrument which ultimately will save buffer space in the instrument.

As depicted in FIG. 1, the controller core 10 does not have a dedicated interface to the Data Trace Unit 16. Instead, the DTU acquires signals from a data-side OCM and from an Auxiliary Processing Unit (APU) Interface 11. The DTU captures the store indicator, address, byte enables, and store data information from the OCM interface, and all load data is acquired from the APU interface. If the current instruction address is required, it is obtained directly from an output from the core through an instruction address register.

The core 10 presents a memory address on the OCM interfaces 26, 28 in the same cycle that it presents the address to the caches 40, 42. If the OCM memory exists and the address is determined to be within its address space, the OCM will respond to the request. This response takes priority over that of the caches. In addition, since all load data appears at the APU 11 regardless of where in memory the data came from, the DTU 16 is adapted to capture all load data off of interface 12. This ensures all load and store data are traced by the DTU whether in OCM address space 28, caches 40, 42, or across the PLB 18. Importantly, the load/store data is obtained prior to the cache.

Figure 2:
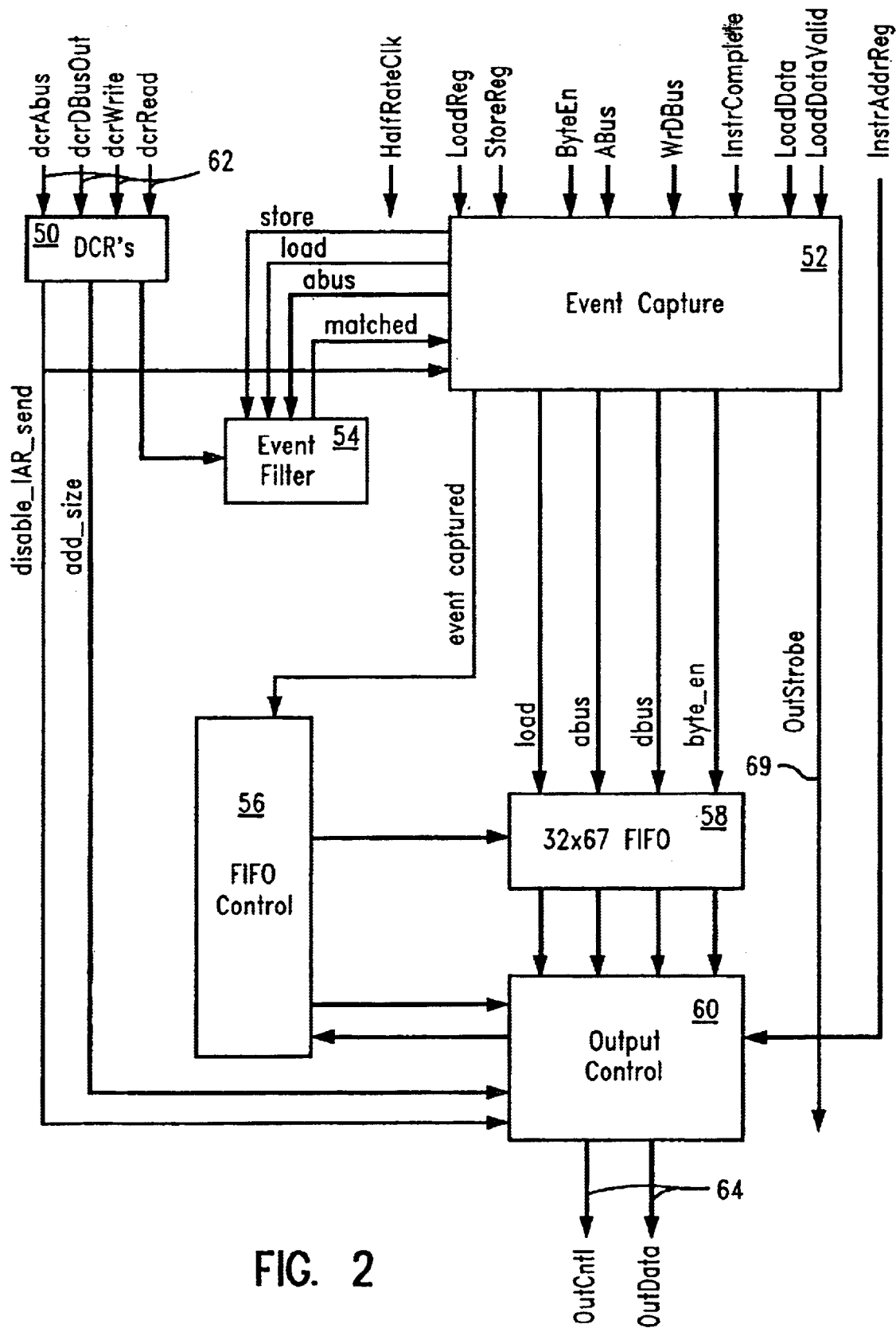
FIG. 2 is a block diagram of the Data Trace Unit of the present invention.

As depicted in FIG. 2, the DTU 16 is comprised of a plurality of register sets or device control registers 50 connected to the core's device control register bus, logic 52, 54 to capture a load or store event data acquired from the OCM and APU interfaces, a First-In First-Out (FIFO) register control 56 and FIFO register array 58 to store the event information, output control logic 60 to transmit the event information off the chip, and support logic to control the data flow.

The device control registers 50 are shown having interface lines 62 for the core's device control register bus. Preferably these lines include device control register address bus, data bus out, write, and read functions. The FIFO register array 58 is a two-port array, depicted in a preferred embodiment as a 32×67 array, however, other array sizes may be accommodated and used successfully in this DTU design.

Architecturally, a number of sets of address match/control device control registers will define which events (load/store instructions) are to be traced. Preferably, eight sets of registers will be implemented. When an event of particular interest occurs, the address, data, byte enables, and event type are saved in a word of the FIFO 58. The output control 60 takes a word out of the FIFO 58, segments the information, and transfers it off the chip via the Data Trace Port 44. Interface lines 64 depict these signals. At a minimum, these signals include output control lines (OutCntl) and output data lines (OutData). In the preferred embodiment, the architecture is capable of supporting a data trace port of 1, 2, 4, 8, or 16 data bits wide, however, the implementation described herein is capable of using either a four or eight bits wide data output depending upon the limitations of a programmable bit setting and the driver connections.

As discussed previously, one problem in the prior art concerned having an output bandwidth that is not compatible with the input event burst rate. In order to remedy this deficiency, the present invention implements a mechanism for reporting lost events due to a FIFO overrun. The architecture of the DTU allows the designer to trade-off the FIFO size with the probability of losing event, which is dependent upon the size of bursts of loads and stores in particular application codes. Also, since it may be desirable to know approximately where in the code a captured load or store event occurred, the instruction address is transmitted prior to transmitting a load/store event or a string of load/store events. This synchronization with the instruction trace stream is accomplished by combining separate instruction and data tracing data streams. The reconstruction software matches load and store addresses and data with particular load and store instructions. To do this, the DTU outputs a FIFO count after a periodic sync event to indicate how many load and store events are previously captured in the FIFO but have not yet been output. The DTU also outputs a strobe signal 69 that gives a cycle accurate indication of when an event was captured. This allows the reconstruction software to match the event with a particular load or store instruction even when not all events pass the event filters.

Figure 3:
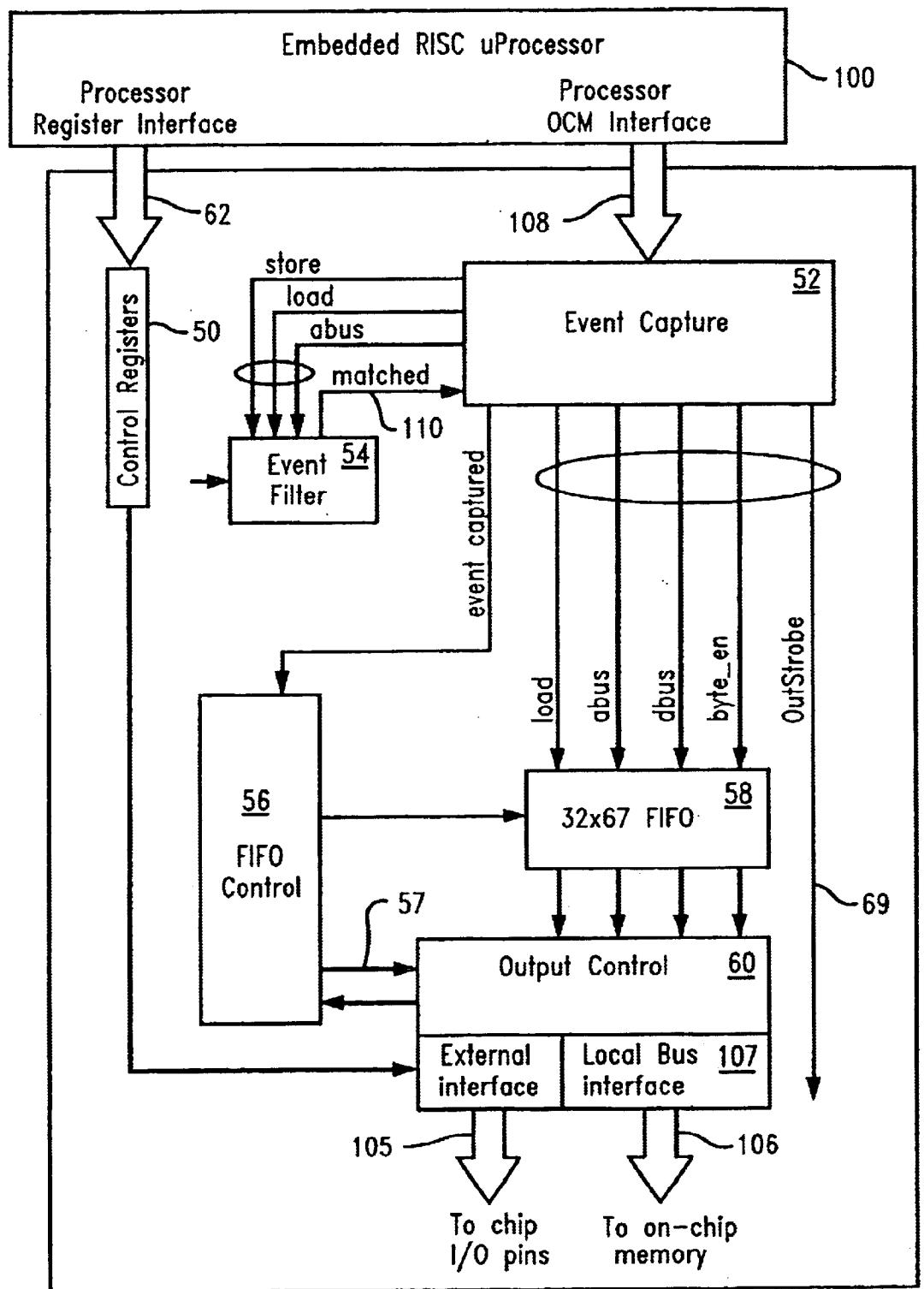
FIG. 3 is a block diagram of the Data Trace Unit of FIG. 2 attached to an embedded processor.

FIG. 3 depicts the DTU attached to an embedded RISC microprocessor 100. Each of the elements of the present invention which are resident on a single silicon chip are shown within the DTU 16. As a whole, the DTU electronically interrogates a processor port via an electrical connection from which it extracts in real-time all the critical parameters that define the load and store operations that the processor has executed. This information includes the address, data, and byte enables of each operation, as well as a load/store indicator. When the address of an operation falls within a defined (predetermined) range, the DTU then assembles this information into a single record that is capable of being transferred as a series of data parcels to external chip I/O 105 or to memory, accessible by an internal bus 106.

Data Trace Unit reconstruction algorithms correlate the data produced by this unit with the instruction stream being executed. Typically, the instruction stream can be discerned by observation and analysis of a separate instruction trace port. The reconstruction code uses data output from both the data and instruction trace ports (items 44 and 46 of FIG. 1) in order demonstrate the complete instruction set executed, along with the address and data values that belong to them. In addition to transferring records that represent processor operations, the DTU also constructs and outputs other miscellaneous records that will enable this reconstruction software to correlate DTU address and data with instruction trace definition.

Device Control Registers (DCRs) 50

One DCR is used as the Output Control Register 60 which allows for enabling/disabling of data tracing, enabling/disabling of the instruction address register, and selection of the number of address bytes to output. Preferably, addresses are aligned on at least a 32-bit word boundary so that the two lower order address bits of the low order byte remain unused and can be adapted as a load or store indicator. The remaining DCRs 50 are divided into sets of Event Address Compare, Event Address Mask, and Event Control Registers, where each set controls an event filter 54.

Event Capture Logic 52

Figure 4:
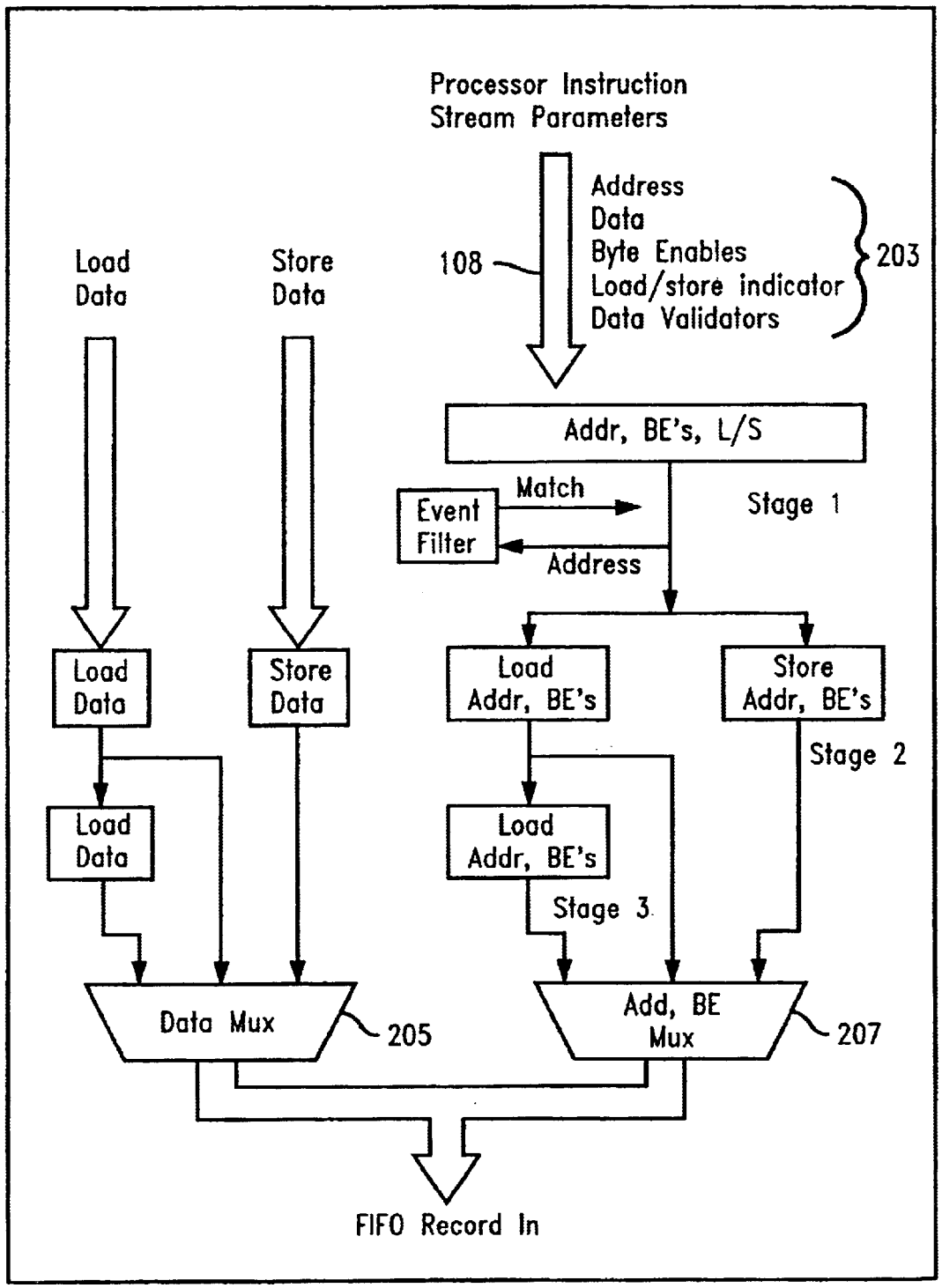
FIG. 4 is a block diagram of the Event Capture logic.

Cores such as the PowerPC 405 do not provide a dedicated interface for the DTU, however, the required information can be obtained from the OCM 26, 28 (FIG. 1) and APU Interface 11 (FIG. 1) interfaces. FIG. 4 is a detailed block diagram of the Event Capture Logic. The Event Capture function obtains the load/store indicator, address, byte enables, and store data from the OCM interface where they occur for all load and store operations 203. When the load data is returned to the core from any memory address, the data and the data-is-present indicator are present at the APU interface one cycle later. The Event Capture function obtains all the load data from the APU interface, including data from the OCM when such data exists.

As depicted in FIGS. 3 and 4, the DTU Event Capture logic 52 interfaces to the processor in a non-intrusive manner at port 108. This interface allows the Event Capture logic to observe processor signals associated with processor load and store operations. Processor signals observed at port 108 present address, data, and byte enable information associated with each load or store operation executed. Additionally, control signals are made available to distinguish loads from stores as well as signals that indicate when data on the aforementioned buses is valid.

The data available at port 108 is presented in real-time as it becomes available in the processor execution pipeline, and as a result, it is possible that valid address and data information may not be presented simultaneously. In addition, during any delays occurring while waiting for the presentation of load operation data, store operations may execute completely. Operations may also be aborted after they have been initiated. One of the functions of the Event Capture logic 52 is to hold the partial record of an operation in a pipeline or stream of information, and only pass it on after all elements of the record have been recorded and all possibility of the operation being aborted has expired. Load/Store data information is sent through a data multiplexor 205, while address and byte enable information is sent through a ADDR/BE multiplexor 207. Both sets of information are presented to the FIFO register (item 58 of FIG. 1).

Event Filter Logic 54

Figure 5:
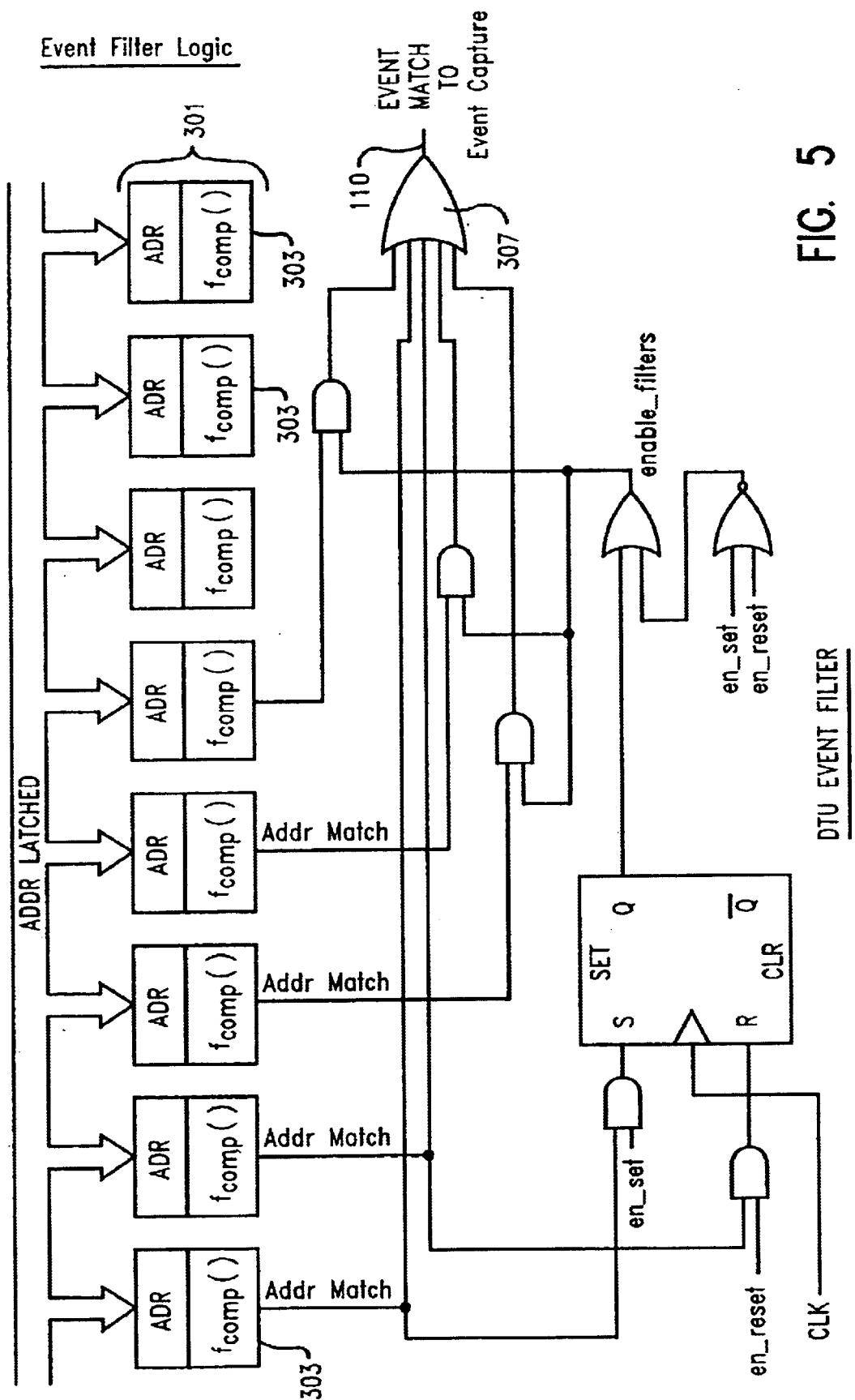
FIG. 5 is a block diagram of the Event Filter logic.

FIG. 5 depicts the Event Filter 54 logic schematic. The event register values are used by the Event Filter function which implements the following logical operation for each of the register sets 301:

1. Perform a logical "XOR" 303 on the core load/store address bit with the corresponding bit in an Event Address Compare register. Preferably, the resultant is "0" for each matching bit, and "1" for each mis-compared bit, although the alternative may also be effectively implemented.

2. Mask the resultant bits from step 1 above, according to an Event Address Mask register. For each bit set in the Event Address Mask register the corresponding bit is combined with a logic "0" by performing a logical "AND" 303. After this operation, all matching and masked (don't care) bits are logic "0".

3. Perform a logic "OR" 303 on the resulting bits. When the result is a logic "1", the address does not match the event description. When the result is "0", the event does match the event description, and the address, data, byte enables, and event type are stored in the FIFO 58 when the event type is enabled in the corresponding Event Control register.

Referring to FIG. 3, the embedded RISC microprocessor 100 operations are qualified for capture based on their address and load/store characteristics. This allows the user to limit the volume of data collected by the DTU 16 and pinpoint observations to the section of the source code under investigation. To qualify for capture, an operations address must fall within one of a set of address ranges. Each address range in the set is defined by an Address Compare High and Address Compare Low register which specify the high and low bounds of the range. Associated with each address range in the set is an Event Control register which defines what types of operations (loads, stores, or both) qualify within the range. In the preferred embodiment, there are eight filter elements. Each element contains the three registers described above along with the magnitude comparison logic required to produce an element match signal for the address range they define. The element match signals are the inputs to a logic section whose output is the global MATCH signal 110 that is sent back to the Event Capture logic 52. The MATCH signal 110 is determined within a single processor cycle. The MATCH signal can be asserted via an simple logic "OR" of the element match signals, or it can be set to hold an asserted level when the Event Filter is operated in an enable mode. In the enable mode, commonly referred to as a "running enable mode", the MATCH signal will set on a match at a first filter element and will reset on a match at a second filter element. The mode of operation of the Event Filter is control register selectable.

When an operations address is qualified by the Event Filter and a MATCH output is produced, the Event Capture logic will wait for the operations data to become available before passing on an assembled record of address, data, byte enables, and load/store indicator to the FIFO memory.

FIFO Memory 58 and Control 56

Referring to FIG. 3, the FIFO memory array 58 is placed between the Event Capture logic 52 and the Output Control logic 60 in order to bridge the instantaneous bandwidth difference between these two blocks of logic. While the Event Capture logic 52 is capable of capturing a processor operation per processor clock cycle, it takes multiple clock cycles for the Output Control logic 60 to transfer the information off-chip or to on-chip memory. The reasons for this are two-fold. First, the Output Control logic operates at a fraction of the speed of the processor in order to drive off-chips nets 105 that have a lower bandwidth than those on-chip. Second, the record representing an operation is parsed by Output Control logic and sent out as a number of smaller data segments.

Preferably, the FIFO Memory consists of 32 words, each 67 bits wide. Each word stores a record that represents a single operation captured by the Event Capture logic. The FIFO Control logic 56 maintains separate write and read address pointers for the FIFO memory array 58. FIFO write address pointers are incremented when the Event Capture logic writes to the array, and read address pointers are incremented when the Output Control logic 60 reads from it. Since the processor can execute operations inherently faster than they can be output by the Output Control logic, it is possible for newly captured event to overwrite the FIFO entries that have not yet been transferred out of the FIFO. An overwritten entry represents a lost event, and the FIFO Control logic is adapted to maintain a counter for such events. The Output Control logic includes lost event records within its output stream so that all captured events are represented, thus permitting an accurate reconstruction of the traced code. By virtue of this lost-event reporting, instead of dropping events, the DTU will report the number of lost events in the output data stream. This is preferable because it avoids confusion during debugging and it is required for the instruction synchronization previously discussed.

The FIFO designates when it contains captured records whenever the FIFO's write address pointer is displaced from its read address pointer. A state machine within the FIFO Control logic indicates this to the Output Control, as depicted by the EVENT_IN_FIFO signal 57.

Output Control Logic 60

Figure 6:
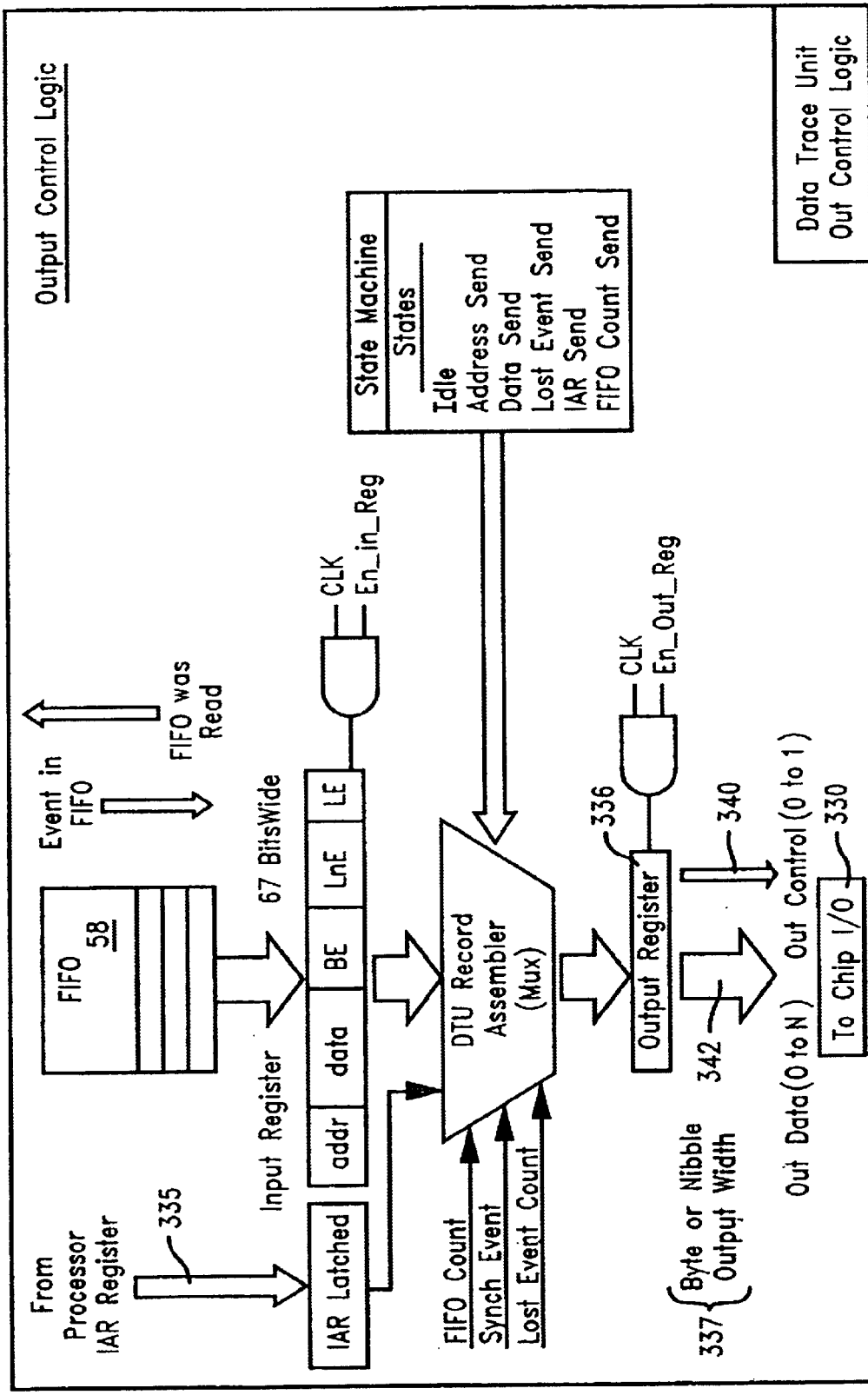
FIG. 6 is a block diagram of the Output Control logic.

FIG. 6 depicts a block diagram of the Output Control logic 60. The Output Control logic 60 takes records from the FIFO 58, parses them into well defined segments, and sequentially passes these segments to an off-chip I/O 330 or to a local bus which has access to general purpose memory. In either case, the output Control logic 60 asserts a signal that the FIFO was read, typically designated as a FIFO_WAS_READ signal, to the FIFO as it latches in a record, permitting the FIFO's read address pointer to be incremented. Nominally, all address, data, and load/store information of the FIFO records are transferred by the Output Control logic. In actuality, bandwidth can be improved by sending only a portion of the data field and address field, preferably by an eight byte data field and four byte address field. The byte enable field of a FIFO record defines which data bytes are valid for transmission. A field in the Data Trace Control register, preferably at two-bit field, defines how many address bytes should be sent.

The Output Control logic takes each word of the FIFO as a load or store event and places the address and data on the OutData port 337 in portions of either a nibble or a byte at a time. A subset of the data may be sent according to the Output Control register 336, and another subset sent according to the number of valid data bytes there are, as determined from the byte enables. Also, if there were lost events, a control character is sent to indicate how many load and store events were lost. Output signals, commonly designated OutCntl<0:1> 340, are used to indicate what is on the OutData <0:7> signals 342. Preferably, the output clock frequency is half that of the core's frequency.

In addition to sending information that relates directly to records read from the FIFO, the Output Control logic may also transfer a number of other record types, for example:

1. Lost Event Count Records

The Lost Event Count Records mentioned previously are derived from a counter in the FIFO Control logic 56. Though the data corresponding to a captured operation may be lost, the Lost Event Count Record informs the reconstruction code of its occurrence, and allows that code to continue accurate association of DTU trace data with the instruction execution stream.

2. FIFO Count Record

The FIFO Count Record is output when a Synchronization Event is indicated by the processor. Synchronization Events occur approximately every two thousand processor clock cycles, and prompts the Instruction Trace Unit to output an Instruction Address Register (IAR) 335. This count represents an additional piece of information used by the reconstruction code to correlate Data Trace and Instruction Trace output.

3. Instruction Address Register (IAR) Record

A record containing the IAR value is transferred whenever a processor operation is captured and the FIFO is empty. When the DTU is run in conjunction with the Instruction Trace Unit (ITU), the IAR values are available from the ITU, thereby making this record redundant. If the DTU is run alone, however, output of this record may be enabled to assist the execution stream reconstruction task.

When a requirement exists to provide an approximate instruction address when a data trace event occurs, the Output Control logic transmits the current Instruction Address Register contents when it is idle, an event is placed in the FIFO, and the IAR output is enabled. In order to minimize additional output bandwidth requirements, when subsequent events are captured before the Output Control logic goes idle, a new IAR is not transmitted. In order for this condition to occur, the subsequent loads and stores should be in close address proximity to the first one. This is useful when the DTU is being used without synchronization with the instruction trace.

Transmitting only one IAR instead of continuously transmitting them while the Output Control is idle simplifies the data collection by external instrumentation. A logic analyzer, for example, would be able to avoid filling its buffer with long strings of idle cycles by allowing everything but the all logic "1" code in. Since it typically takes anywhere from between three to nine cycles to transmit a single event over eight data pins, the net effect of transmitting the IAR is that the first event is delayed (four cycles in an implementation using eight data pins). This effectively reduces the FIFO depth by less than one. The transmission of the IAR can be disabled using the Output Control Register.

The transmission event of the Data Trace Port is adapted to adhere to the following procedure:

1. When there are no events to send, idle characters are transmitted.

2. If an event is inserted into an empty FIFO and transmission of the IAR is enabled in the Output Control Register, a snapshot of the current IAR from the core is taken and transmitted.

3. When there is a partial load/store, wherein not all byte enables are set, a control byte is sent first indicating which data bytes will be forwarded.

4. The appropriate number of address bytes are then sent depending upon the Output Control Register setting.

5. The appropriate number of data bytes are then sent.

6. If events have been lost since the previous event was transmitted, a control character is inserted into the output stream at the point of the losses, indicating the number of lost load and/or store events. The event counters are then reset The counts of lost loads and stores are maintained and output independently of each other.

Two output modes are available in the instant design, external mode and internal mode.

External Mode

In external mode, parsed segments of the different record types are passed to the external chip I/O via an output bus that includes a data field, control field, and clock. Typically, the control field is two bits wide and contains a code indicating the type of information present in the data field, such as address, data, lost event, byte enable, IAR, to name a few. The data field width can vary. Preferably it is on the order of four to eight bits wide. By including a variable output data width, the design allows for a tradeoff to be made of output bandwidth against the chip I/O usage.

Internal Mode

In internal mode, the trace information can be stored in memory that is accessible by an internal bus. In the preferred embodiment, this section of logic interfaces to a logic processor local bus (item 107, FIG. 3). Data may be transferred in bit parcels, preferably 32-bit parcels. At this rate, it would take two PLB transactions to transfer the information contained in a single FIFO record.

In addition to outputs sourced directly by the Output Control logic, there are a number of other DTU outputs not sourced by this logic. For example, a signal to indicate that a processor operation has qualified for capture at the Event Capture Logic. This signal is commonly referred to as an OutStrobe <0:1> signal. Since this signal is driven from the same half-speed clock relative to the processor that paces the Output Control Logic, two of these signals are needed; one for the even processor cycles, and one for the odd processor cycles.

Each one cycle assertion of the OutStrobe signal corresponds to a single processor operation that has been captured by the DTU. These signals correspond directly to the odd and even Event Status strobes that are issued by the Instruction Trace Unit, whose assertions indicate among other things, that a processor operation has been executed, even though it may not qualify for capture at the DTU.

The Data Trace Unit uses a combination of the following methods to achieve a low bandwidth output path:

a) a FIFO for buffering or smoothing the bursts of load and store events;

b) sets of event filters to allow outputting only events in the address ranges of interest;

c) a programmable output path width to trade off event output capability with additional I/O pin cost;

d) a lost event indicator to allow for the possibility of FIFO overrun;

e) an output control pin encoding to allow for a variable number of output cycles per event;

f) a transmission of only valid data bytes based on the byte enables;

g) a transmission of the programmable minimum number of address bytes of interest;

h) a transmission of the program counter (IAR) only when the DTU becomes non-idle; and, i) an allowance of the output stage to run at a clock rate of some sub-multiple of the microprocessor's rate, if necessary, to be within the bandwidth capability of the I/O drivers and the external instrumentation.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An integrated real-time data tracing apparatus for analyzing microprocessor based computer systems, comprising:

an embedded core controller;

a processor local bus connected to said core controller;

a memory controller interfacing to said processor local bus;

an embedded random access memory accessible by said memory controller;

an instruction cache and a data cache interfacing with said core controller;

an instruction side on-chip memory and a data side on-chip memory interfacing with said core controller; and, a data trace unit connected to said data-side on-chip memory and to an auxiliary processor unit interface, said data trace unit comprising electronic logic circuitry to electronically monitor in real-time parameters sufficient to define the load and store operations information that said core controller may assert, process information during events, select multiple address ranges for tracing, filter said information, and synchronize data trace information with instruction trace information.

2. The apparatus of claim 1 wherein said load and store operations information comprises address, data, and byte enables of an operations indicator and a load/store indicator.

3. The apparatus of claim 1 wherein said data trace unit comprises:

device control registers connected to said embedded core controller;

event capture logic connected to said instruction side on-chip memory and said data side on-chip memory, having outputs to event filter logic, a FIFO array, and a FIFO control module;

said event filter logic receiving store, load and address bus lines from said event capture logic, and returning a match signal to said event capture logic;

said FIFO control module interfacing with said FIFO array, adapted to receive an event capture signal from said event capture logic, and output information to output control logic;

said output control logic having an external interface to communicate via I/O pins, and a local bus interface to communicate to said embedded random access memory.

4. The apparatus of claim 3 further comprising software algorithms for reconstruction of data produced by said data trace unit with an instruction stream of data being executed.

5. The apparatus of claim 3 wherein said device control registers interface to a device control register bus.

6. The apparatus of claim 5 wherein said device control registers interface comprises lines for device control register address bus, data bus out, write, and read functions.

7. The apparatus of claim 3 wherein said FIFO array comprises a two-port array.

8. The apparatus of claim 7 wherein said FIFO array comprises a 32×67 array.

9. The apparatus of claim 5 further comprising a plurality of device control registers including address mask and control device control registers to define particular events.

10. The apparatus of claim 9 wherein said plurality of device control registers comprises eight sets of registers.

11. The apparatus of claim 4 wherein said algorithms discern said instruction stream from a separate instruction trace port.

12. The apparatus of claim 4 wherein said algorithms use data output from both data and instruction trace ports to demonstrate a complete executed instruction set.

13. The apparatus of claim 3 wherein said output control logic is configured to take a word from said FIFO array, segment information from said word, and transfer said information off-chip via a data trace port.

14. The apparatus of claim 3 wherein said output control logic comprises output control lines and output data lines.

15. A data trace unit apparatus for a single chip integrated circuit embedded core controller designed to achieve a low bandwidth output path, comprising:
- a FIFO control and array for buffering the bursts of load and store events;
- a plurality of event filters to distinguish only those events in predetermined address ranges;
- an output path having a programmable width;
- a lost event indicator capable of accommodating an overrun of said FIFO; and,
- encoding circuitry for encoding an output control pinout, allowing for a variable number of output cycles per event.

16. The apparatus of claim 15 wherein said data trace unit further comprises electronic circuitry adapted to transmit valid bytes based on byte enables.

17. The apparatus of claim 15 wherein said data trace unit further comprises electronic circuitry adapted to transmit a programmable minimum number of address bytes.

18. The apparatus of claim 15 wherein said data trace unit further comprises electronic circuitry adapted to transmit an instruction address register program counter when said data trace unit is non-idle.

19. The apparatus of claim 15 wherein said data trace unit further comprises electronic circuitry adapted to allow an output stage to run at a clock rate of a sub-multiple of said embedded core controller's clock rate.

20. A real-time data tracing apparatus on an integrated circuit chip comprising:
- an embedded core controller that allows visibility of address and control signals being presented to caches;
- a data trace unit designed to acquire signals from said core controller through a data-side on-chip memory module interface and through an auxiliary processing unit interface, said data trace unit adapted to view said address and control signals being presented to said caches by said embedded core controller, capture store indicator, address, byte enables, and store data information from said on-chip memory module interface, and capture load data from said auxiliary processing unit interface;
- a processor local bus for interfacing said core controller with memory modules;
- a data trace port interfacing with said data trace unit; and,
- an instruction trace port connected to said core controller.

21. The apparatus of claim 20 wherein said core controller is connected to device control registers through a device control register bus.

22. The apparatus of claim 20 wherein said data trace unit further comprises electronic logic circuitry to obtain current instruction addresses directly from an output of said core controller.

23. The apparatus of claim 20 wherein said data trace unit comprises electronic logic circuitry designed to transmit information via said data trace port, said electronic logic circuitry adapted to adhere to procedural restrictions including:
- sending idle characters when no events are present;
- taking a snapshot of a current instruction address register from said core controller when an event is inserted into an empty FIFO array and transmission of an instruction address register is enabled;
- sending a control byte when there is a partial load/store or when not all byte enables are set;
- sending an appropriate number of address bytes as a function of an output control register setting; and,
- inserting a control character into an output stream at the point of losses when events have been lost since a previous event was transmitted, and resetting event counters.

24. The apparatus of claim 21 wherein said data trace unit further comprises:
- a plurality of register sets connected to said device control register bus;
- event capture logic having electronic logic circuitry capable of capturing a load or store event data acquired from said on-chip memory and said auxiliary processor unit interface;
- a FIFO register control and a FIFO array having electronic logic circuitry for storing said event information;
- output control logic having electronic logic circuitry for transmitting information from said event off said integrated circuit chip; and,
- support logic to control data flow.

25. The apparatus of claim 20 further comprising instruction and data caches connected to said processor local bus.

26. The apparatus of claim 20 further comprising static random access memory modules connected to said instruction side on-chip memory and said data side on-chip memory.

27. The apparatus of claim 26 further comprising a 16 Kb static random access memory for said instruction side on-chip memory, and a 4 Kb static random access memory for said data side on-chip memory.

28. The apparatus of claim 24 further comprising a data trace port connected to said data trace unit, and an instruction trace port connected to said core controller.

29. A data trace unit apparatus for a single chip integrated circuit embedded core controller comprising electronic logic circuitry adapted to:
- access control, address, and data signal lines required to monitor said embedded core controller's activities;
- perform data tracing independent of instruction tracing;
- synchronize with an instruction trace stream;
- allow for selection of multiple ranges for data tracing;
- report lost events to a FIFO array; and,
- output strobe signals to give a cycle accurate indication of when an event has been captured.

30. The apparatus of claim 29 wherein synchronizing with said instruction trace stream further comprises combining separate instruction and data tracing streams through reconstruction software that matches load and store addresses and data with particular load and store instructions.

31. The apparatus of claim 30 further comprising outputting a FIFO count after a periodic sync event to indicate how many load and store events have been captured in said FIFO array but have not been output at the time of said sync event.

32. The apparatus of claim 29 wherein reporting lost events further comprises reporting the number of lost events in an output data stream.

* * * * *